United States Patent Office 3,516,551
Patented June 23, 1970

---

3,516,551
CYCLONE SEPARATOR
Emil Olof Lennart Wallén, Stockholm, and Frank Peter August Neumann, Enebyberg, Sweden, assignors to Grubbens & Co. Aktiebolag, Stockholm, Bandhagen, Sweden, a Swedish joint-stock company
Filed June 11, 1968, Ser. No. 736,147
Claims priority, application Germany, June 13, 1967, G 50,341
Int. Cl. B01d 21/26
U.S. Cl. 210—512             1 Claim

ABSTRACT OF THE DISCLOSURE

A cyclone separator having a controllable valve in the inlet line, the valve member of which is close to the separator container. The valve member is also substantially parallel to the central axis of the cyclone separator and substantially tangential to the separator container and has an angle of 20–90° to the inlet direction.

PRIOR ART CYCLONE SEPARATORS

Figure 1:
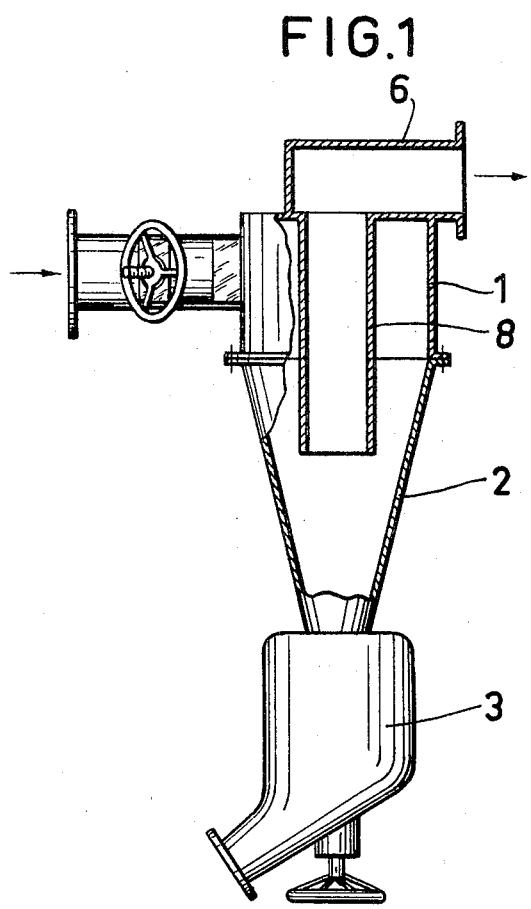

Cyclone separators are commonly used for separation of impurities from suspensions or the like and have normally a vertically disposed separator container. The contaminated suspension is supplied substantially to a cylindrical or conical upper portion of the container, after which the suspension flows downwards in a circular flow into a usually conical container portion under the upper portion so that the separation of the impurities takes place, which have accumulated in the outer zone of the whirl. Then the suspension flows upwards inside of the outer whirl and is discharged through an outlet.

If the viscosity increases to a relatively high value the achieved separation effect is relatively low for cyclone separators, in which the suspension takes place as above. This is caused by a rapid loss of velocity in the separation unit due to the viscosity effect. As the velocity only depends on the supply, the only way of increasing the velocity is to reduce the cross section of the nozzles.

In another arrangement a rotor with vanes was mounted at the inlet in the upper portion of the separator in order to increase the velocity and consequently also the cleaning effect. This construction has the disadvantage that it is subected to the wearing effect of all the impurities. In addition to this it leads to a random, i.e. uncontrolled turbulence at the inlet section, which also influences the separation effect. Moreover such a separator can be clogged by thready and filamentary impurities, which are often found in the suspension and twist about the rotor reducing the effect and causing functional trouble.

It is also known to mount a rotor in the outlet of a cyclone separator. This arrangement is for instance known from the British Pat. 1,018,743. In this known device normally an increase of the velocity or the torque in the upper part is achieved, but if such suspensions as pulp suspensions are used and the concentration is high, the rotor cannot support by means of its advancing effect to any large extent the rotation of the suspension in the lower parts.

SUMMARY OF THE INVENTION

The depicted disadvantages of these prior art cyclone separators are eliminated in the cyclone separator according to the invention. The cyclone separator according to the invention is adapted for separating impurities from liquids, suspensions, etc. and is provided with a preferably vertical container consisting of a cylindrical or conical upper portion and a preferably conical lower portion, an inlet being substantially tangential to the upper portion for the liquid to be cleaned and an outlet being connected to the container for the cleaned suspension. This cyclone separator comprises the improvement that a controllable valve is positioned close to the container, the valve member of which is substantially tangential thereto, is directed in an angle of 20–90° to the inlet direction adjacent to the valve and substantially parallel to the central axis of the cyclone separator, in order to cause an increase of the velocity at the whirl and to adjust the lower turning point of the liquid in the lower portion of the container so that the velocity in the upper portion is maintained or increased during the whole separation process, the outlet being provided with a conical or cylindrical extension so that the lower part of the outlet ends under the opening of the inlet.

The expression "liquid" is herein intended to mean liquids, suspensions, emulsions and the like, the impurities of which normally are solid materials having greater density than the liquid.

Moreover, the cyclone separator can comprise a rotor or the like in the outlet adjacent to the container in order to increase additionally the velocity and to re-establish the pressure drop in the separator at the whirl of the suspension.

The cyclone separator can according to its characteristic and the inlet velocity be provided with either only the controllable valve or with the valve and a rotor.

In a preferred embodiment the present cyclone separator is combined with a rotor in the outlet as in the cyclone separator of the British Pat. 1,018,743. In this embodiment the outlet adapted at the upper end of the separation container can extend axially upwards before the rotor and behind it tangentially outwards, the rotor being designed as a pump wheel with radial or curved vanes.

The outlet is preferably designed as a screw-shaped pump housing.

With respect to the axially directed part of the outlet the rotor is preferably eccentrically adapted.

Normally the outlet disposed at the upper end of the separator container is directed substantially vertically along the whole of it, the rotor being designed as a screw or propeller.

The cyclone separator according to the invention results is considerably improved cleaning effect, which must partly be ascribed to the maintained or increased velocity as well as the torque. This is of essential importance, as the final separation of impurities takes place exactly at the place, where the flow direction of the rotating suspension is reversed, i.e. when the suspension turns. Maintaining velocity within the unit is consequently essential for the complete separation of the impurities from the suspension and for the maintenance of a high enough centrifugal force in the ascending stream to prevent re-entrainment.

Figure 2:
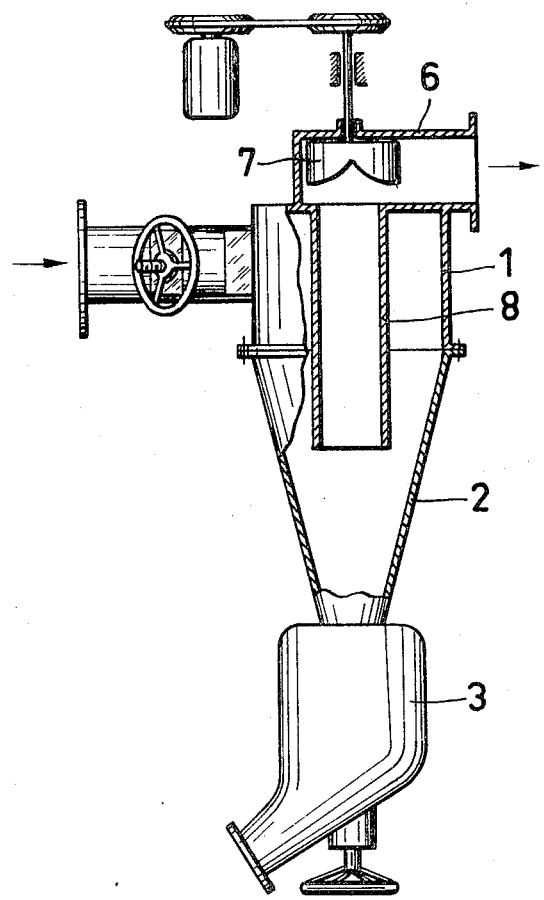

In the embodiment having a rotor mounted on a shaft, cf. FIG. 2, in the outlet, the inlet energy is considerably less than in conventional separators, in which a considerable pressure drop is caused between the inlet and the outlet. In the separator according to the invention neither a pressure drop nor a pressure increase takes place. As a result of placing the rotor etc. in the outlet neither wear nor clogging will occur, because the impurities in the suspension are separated in the container before its transfort towards the outlet and the rotor.

Figure 3:
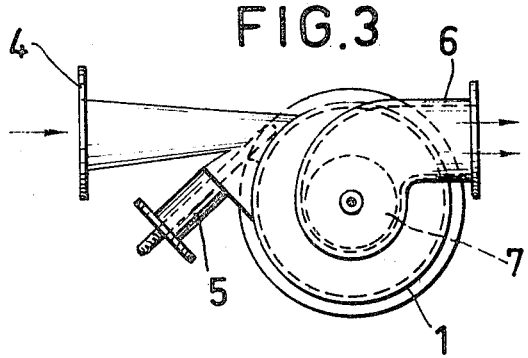

In the embodiment without rotor the outlet pipe can of course be adapted in the same way as at the embodiment with rotor. It can of course be adapted in any known way with or without rotor. The outlet pipe can for instance be substantially vertical. The supply line before the valve should preferably be narrowed, i.e. the cross section of the pipe becomes more and more narrow near the valve as shown in FIG. 3. The cross sectional area immediately at the valve should preferably also be 25–75%, preferably 50%, of the usual cross section area of the supply line. Additional constriction is obtained by the valve, which can be near 0%, preferably minimum 20% of the cross section area of the supply line. The supply line before the valve, especially the narrower part, can have any suitable form, for instance round, elliptic or preferably square.

In a suitable embodiment the valve is a controllable constriction member, preferably in the form of a slide valve having a gate vane and means for reciprocating the gate vane across the inlet pipe opening (FIG. 3) or damper, a controllable or turnable lid, the front end of which can be designed straight crescent-shaped, toothed or with similar cuts in order to facilitate the passing of the impurities of the suspension.

It is essential that the opening of the valve is provided from the wall of the inlet being tangential to the wall of the separator container. It is also essential that the valve member will not disturb the flow of the liquid along this wall into the container. Thus a preferred valve is a sluice valve or a slide valve, the slide of which is tangential to the container, is directed 20–90° from the flow direction, parallel to the central axis of the separator and contiguous to the separator container.

CONTENT OF DRAWING

The invention will be described more in detail with reference to the accompanying drawing, in which some embodiments of a cyclone separator according to the invention are illustrated. FIG. 1 shows a side view of an embodiment partly cut open and in section. FIG. 2 is a side view of another embodiment according to the invention and FIG. 3 is a top view of the embodiment in FIG. 2.

The separation container illustrated on the drawing consists in all embodiments shown of a cylindrical upper portion 1 and a lower conical portion 2. In the lower part of the conical portion 2 a container or funnel 3 is connected to catch and collect the impurities separated during the process of separation. The lower part of the conical portion 2 as well as the container 3 can be provided with sight glasses permitting inspection of the separation process.

In all embodiments the contaminated suspension is supplied substantially tangentially through an inlet pipe in the upper portion 1. The connection of the inlet pipe is designated by the number 4 and the controllable valve 5. After its cleaning in the separation container the suspension flows out through an outlet pipe 6, which may be drawn in a plurality of different ways, suitable for example for the external adaptation. In the outlet 6 and in immediate connection to the separation container, a schematically shown rotor 7 is mounted (FIG. 2).

With the valve according to the invention it is possible to obtain the following advantages:

The size of the inlet pipe or the inlet opening can always be adapted to the existing conditions, for instance the density of the supplied stock etc., which guarantees the optimum inlet velocity (rotation velocity in the cyclone separator) and consequently also the efficiency of the whirl. By means of the valve according to the invention the great advantage is obtained that the inlet velocity can be exactly set when starting operation. At irregular supply the inlet velocity can be controlled. The valve can be regulated automatically relative to the supply. The valve can operate as a blocking valve built-in in the separator. In this case the requirements as to space for the blocking valves in the supply line disappear.

In the embodiment of the cyclone separator according to the invention having a rotor mounted in the outlet the apparatus operates as follows: The contaminated suspension supplied tangentially under pressure through connection 4 is rotated and flows then downwards into the conical portion 2 so that the impurities accumulating in the outer zone of the whirl on account of the centrifugal effect are separated and go off downwards into the container 3. The controllable damper 5 serves for exact adjustment of the inlet velocity in the upper portion 1 of the separator and of the turning point in the lower part of the conical portion 2. The suspension thus cleaned flows upwards inside of the outer whirl and is discharged via the outlet 6. Due to the suitably placed rotor 7 the suspension is subjected to a pumping or sucking effect, which causes an increase in velocity with whirl promoting effect in the suspension. In order to obtain the best possible pumping or sucking effect at different kinds of outlet pipes the rotor is constructed in different ways.

In the embodiment shown in FIGS. 2 and 3 the outlet pipe is directed first centrally vertically upwards and axially in relation to the rotor inserted and then tangentially outwards in relation to the rotor. In this way a suitable pumping or sucking effect is achieved, as the rotor is built as a pump wheel with radial or curved vanes. It might be suitable to arrange the centre of the rotor somewhat eccentric in the centrally adapted outlet or to give this part of the outlet the shape of a helical pump housing. It is an advantage with the embodiments shown that the inlet and outlet connections can be arranged in line, which facilitates the outer piping.

What is claimed is:

1. A cyclone separator for the removal of impurities from fluids in which the impurities are suspended, comprising:
   (a) a substantially vertically disposed container member having a top wall and a cylindrical upper portion in communication and connected with a downwardly tapering conical portion;
   (b) a tubular inlet pipe for the suspension to be cleaned connected tangentially via an opening to said upper container portion;
   (c) a cylindrical outlet pipe for the cleaned suspension mounted at the upper end of said container and connected thereto, said outlet pipe having a receiving portion extending vertically downward into said lower conical portion of said container;
   (d) said outlet pipe having a discharge portion at its upper end connected to the receiving portion and extending outwardly therefrom above the upper end of said container, and having its outlet opening located beyond the cylindrical upper portion of said container;
   (e) a vane rotor mounted on a shaft located in the discharge portion of the outlet pipe and positioned above the upper opening of the receiving portion of the outlet pipe and coaxially with the receiving portion;
   (f) a container connected to the bottom outlet of said conical portion to receive accumulated separated impurities;
   (g) a slide valve mounted on said inlet pipe having a gate vane positioned in said inlet pipe contiguous to said opening from said inlet pipe into said upper portion of the container, said gate vane extending tangentially to the container inwardly across said opening, means for reciprocating said gate vane across said opening; and (h) said tubular inlet pipe tapering toward said slide valve so that its cross sectional area adjacent to the gate vane is from about 25% to about 75% that of its full cross sectional area.

References Cited

UNITED STATES PATENTS

| | | | |
|---|---|---|---|
| 453,105 | 5/1891 | Bretney | 210—512 |
| 619,912 | 2/1899 | Sutcliffe | 55—459 |
| 911,258 | 2/1909 | Neumann | 209—144 |
| 1,514,915 | 11/1924 | Laukhuff | 209—144 |
| 1,844,369 | 2/1932 | Ross | 55—418 |
| 2,093,257 | 9/1937 | Thorsen | 55—459 |
| 2,482,642 | 9/1949 | Sylvan | 55—459 |
| 2,779,469 | 1/1957 | Harris | 209—211 |
| 3,057,476 | 10/1962 | Gilbert | 210—512 |
| 3,093,468 | 6/1963 | Krochta | 55—238 |
| 3,128,320 | 4/1964 | Umbricht | 55—238 |
| 3,215,165 | 11/1965 | Boadway | 55—459 |
| 3,254,478 | 6/1966 | Szego | 55—459 |
| 3,288,286 | 11/1966 | Prins et al. | 209—211 |

FOREIGN PATENTS

| | | |
|---|---|---|
| 736,004 | 6/1943 | Germany. |
| 1,018,743 | 2/1966 | Great Britain. |

FRANK W. LUTTER, Primary Examiner

B. NOZICK, Assistant Examiner

U.S. Cl. X.R.

55—418, 459; 209—211